(12) United States Patent
Zribi et al.

(10) Patent No.: US 7,796,269 B2
(45) Date of Patent: Sep. 14, 2010

(54) IRREGULARLY SHAPED ACTUATOR FINGERS FOR A MICRO-ELECTROMECHANICAL SYSTEM FABRY-PEROT FILTER

(75) Inventors: Anis Zribi, Rexford, NY (US); Glenn S. Claydon, Wynantskill, NY (US); Long Que, Rexford, NY (US); Stacey Kennerly, Niskayuna, NY (US); Shankar Chandrasekaran, Tamil Nadu (IN); Shivappa Goravar, Karnataka (IN); David C. Hays, Niskayuna, NY (US); Ayan Banerjee, Karnataka (IN)

(73) Assignee: Morpho Detection, Inc., Newark, CA (US)

( * ) Notice: Subject to any disclaimer, the term of this patent is extended or adjusted under 35 U.S.C. 154(b) by 307 days.

(21) Appl. No.: 11/502,187

(22) Filed: Aug. 10, 2006

(65) Prior Publication Data

US 2010/0182608 A1    Jul. 22, 2010

Related U.S. Application Data

(63) Continuation-in-part of application No. 11/447,779, filed on Jun. 6, 2006.

(51) Int. Cl.
*G01J 3/45* (2006.01)
(52) U.S. Cl. ...................................... 356/454
(58) Field of Classification Search ................ 356/454, 356/480, 519, 481, 517
See application file for complete search history.

(56) References Cited

U.S. PATENT DOCUMENTS

| | | | |
|---|---|---|---|
| 6,674,065 B2 | 1/2004 | Atia et al. | |
| 6,836,597 B2 | 12/2004 | Chan | |
| 2002/0072015 A1 | 6/2002 | Miller et al. | |
| 2002/0091324 A1 | 7/2002 | Kollias et al. | |
| 2002/0168136 A1 | 11/2002 | Atia et al. | |
| 2002/0172239 A1* | 11/2002 | McDonald et al. | 372/20 |
| 2002/0181849 A1 | 12/2002 | Flanders | |
| 2003/0071216 A1 | 4/2003 | Rabolt et al. | |
| 2003/0085196 A1 | 5/2003 | Coppeta | |
| 2003/0108306 A1 | 6/2003 | Whitney et al. | |
| 2003/0139687 A1 | 7/2003 | Abreu | |
| 2003/0161374 A1 | 8/2003 | Lokai | |
| 2004/0104642 A1* | 6/2004 | Takeuchi et al. | 310/328 |
| 2005/0030533 A1* | 2/2005 | Treado | 356/326 |
| 2005/0030545 A1* | 2/2005 | Tuschel et al. | 356/454 |
| 2005/0047721 A1* | 3/2005 | Chen et al. | 385/40 |
| 2005/0156481 A1* | 7/2005 | Zhou et al. | 310/309 |

(Continued)

OTHER PUBLICATIONS

Ariel Lipson and Eric Yeatman, "MEMS Photonic Band Gap Filters", Imperial College London, Optical and Semiconductor Devices, Microsystems, Optical. [Retrieved Apr. 7, 2006]. Retrieved from Internet: URL: http://www3.imperial.ac.uk/opticalandsemidev/microsystems/optical/memsphotonicbandga.. 3pgs.

*Primary Examiner*—Tarifur Chowdhury
*Assistant Examiner*—Jonathan M Hansen
(74) *Attorney, Agent, or Firm*—Armstrong Teasdale LLP

(57) ABSTRACT

According to one embodiment, a micro-electrical mechanical system apparatus includes (i) a comb drive actuator having at least one irregularly shaped finger and (ii) a movable Fabry-Perot filter cavity mirror coupled to the comb drive actuator. According to some embodiments, a relationship between a voltage applied to the comb drive actuator and an amount of displacement associated with the movable mirror is substantially linear.

20 Claims, 13 Drawing Sheets

U.S. PATENT DOCUMENTS

2005/0185680 A1* 8/2005 Tokunaga et al. ............. 372/20
2005/0273990 A1* 12/2005 Takeuchi et al. ........... 29/25.35
2009/0152980 A1* 6/2009 Huang ....................... 310/309

* cited by examiner

US 7,796,269 B2

IRREGULARLY SHAPED ACTUATOR FINGERS FOR A MICRO-ELECTROMECHANICAL SYSTEM FABRY-PEROT FILTER

CROSS-REFERENCE TO RELATED APPLICATIONS

This is a continuation-in-part application of application Ser. No. 11/447,779, entitled "MICRO-ELECTROMECHANICAL SYSTEM FABRY-PEROT FILTER CAVITY" and filed on Jun. 6, 2006. The entire contents of that application are incorporated herein by reference.

BACKGROUND

Devices may sense the presence (or absence) of particular molecules. For example, a miniature or hand-held spectrometer might be used to detect biological, chemical, and/or gas molecules. Such devices might be useful, for example, in the medical, pharmaceutical, and/or security fields. By way of example, a hand-held device might be provided to detect the presence of explosive materials at an airport.

In some sensing devices, light reflected from a sample of molecules is analyzed to determine whether or not a particular molecule is present. For example, the amount of light reflected at various wavelengths might be measured and compared to a known "signature" of values associated with that molecule. When the reflected light matches the signature, it can be determined that the sample includes that molecule.

In some sensing devices, a Fabry-Perot filter such as the one illustrated in FIG. 1 is used to analyze light reflected from a sample of molecules. The filter 100 includes a first partially reflecting mirror 110 and a second partially reflecting mirror 120 that define a resonant cavity C. Broadband light enters the filter 100, and some photons reflect off of the first mirror 110 while others pass through the mirror 110 and enter the cavity C. While in the cavity C, the photons bounce between the first and second mirrors 110, 120, and eventually some of the photons pass through the second mirror 120 and exit the filter 100.

As the photons bounce within the cavity C, interference occurs and an interference pattern is produced in light exiting the filter 100. As a result, light having a specific wavelength may exit the filter 100. Note that the interference occurring within the cavity C is associated with the distance d between the two mirrors 110, 120. Thus, the filter 100 may be "tuned" to output a particular wavelength of light by varying the distance d between the mirrors 110, 120 (e.g., by moving at least one of the mirrors 110, 120).

In some cases, one of the mirrors is formed using a diaphragm that can be flexed to change the distance d. For example, FIG. 2 is a side view of a Fabry-Perot filter 200 implemented using a flexible diaphragm mirror 210 and a fixed mirror 220. By measuring light reflected from a sample using various distances d (i.e., at various wavelengths), and comparing the results with a known signature of values, it may be determined whether or not a particular molecule is present in a sample. The diaphragm 210 might be flexed, for example, by applying a voltage difference between the mirrors 210, 220.

Such an approach, however, may have disadvantages. For example, the curving of the flexible diaphragm mirror 210 may limit its usefulness as a Fabry-Perot mirror. Moreover, the use of a flexible diaphragm mirror 210 may introduce stress over time and lead to failures. The design might also require bonding materials together that have different thermal characteristics—which can lead to problems at relatively high, low, or dynamic temperature environments. In addition, as the size of the cavity C is reduced, it can be difficult to efficiently control the movement of the flexible diaphragm mirror 210. Note that the use of piezoelectric elements to move mirrors arranged as in FIG. 2 can result in similar problems.

SUMMARY

According to some embodiments, a comb drive actuator has at least one irregularly shaped finger, and at least one movable Fabry-Perot filter cavity mirror is coupled to the comb drive actuator.

Other embodiments may include: means for routing light from a sample of molecules into a tunable Fabry-Perot cavity; means for actuating a movable Fabry-Perot filter cavity mirror using a comb drive actuator having at least one irregularly shaped finger, wherein actuation distances are associated with a spectral range of light wavelengths; and means for detecting interference patterns across the spectral range.

Yet other embodiments may be associated with a spectrometer having a laser source and an analyte sample to reflect light from the laser source. A Fabry-Perot filter cavity to receive the reflected light may include: a comb drive actuator having at least one irregularly shaped finger, and at least one movable Fabry-Perot filter cavity mirror coupled to the comb drive actuator. A detector may detect photons exiting the Fabry-Perot filter cavity over time as the movable mirror is moved by the comb drive actuator. A decision unit may also be provided to determine if the analyte sample is associated with at least one type of molecule based on the sensed photons.

Still other embodiments may be associated with a micro-electrical mechanical system apparatus that includes (i) a comb drive actuator driven by a voltage and having at least one irregularly shaped finger and (ii) at least one movable Fabry-Perot filter cavity mirror coupled to the comb drive actuator, wherein a relationship between the voltage and an amount of displacement associated with the movable mirror is substantially linear.

DETAILED DESCRIPTION

Figure 3:
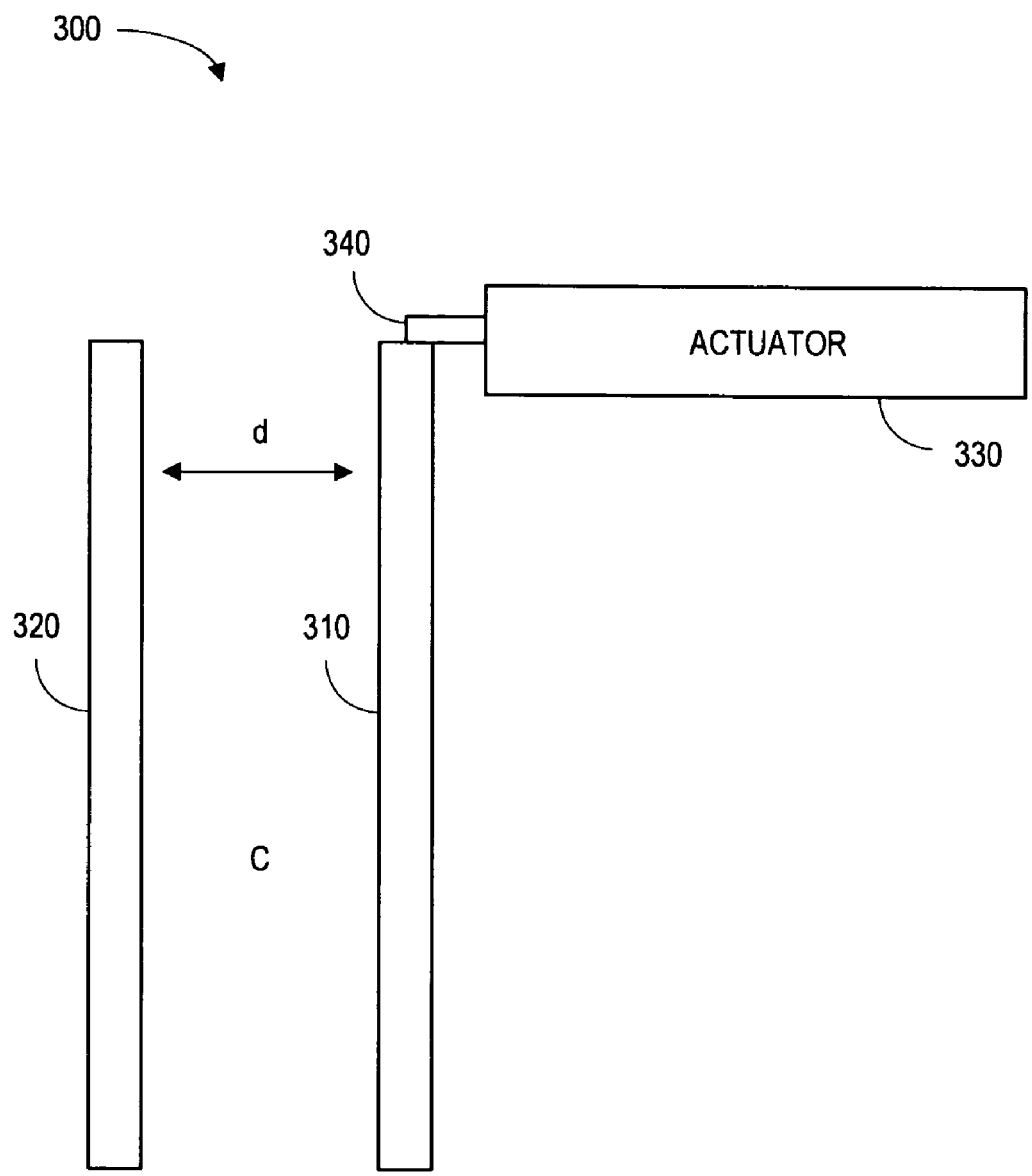
FIG. 3 is a side view of a Fabry-Perot filter in accordance with an exemplary embodiment of the invention.

FIG. 3 is a side view of a Fabry-Perot filter 300 in accordance with an exemplary embodiment of the invention. The filter 300 includes a first partially reflecting mirror 310 and a second partially reflecting mirror 320 that define a resonant cavity C. According to this embodiment, the first mirror 310 acts as a movable mirror while the second mirror 320 is fixed. Note that the movable mirror 310 may be substantially parallel to the fixed mirror 320.

The filter 300 further includes an actuator 330 which, according to some embodiments, may be a bi-stable structure. As used herein, the phrase "bi-stable" structure may refer to an element that can rest in a first latched position or a second latched position. In this case, the actuator 330 may be snapped between the two latched positions to scan the filter 300. The actuator 330 might be associated with, for example, a comb drive. According to some embodiments, a spring may be coupled to the movable mirror 310 and/or actuator 330 to improve control.

According to some embodiments, the actuator 330 is oriented within a plane, such as a plane defined by a surface of a silicon wafer. Note that the movable and/or fixed mirrors 310, 320 may be oriented substantially normal to that plane (e.g., vertically within the wafer). According to some embodiments, the movable or fixed mirrors 310, 320 may be associated with a crystallographic plane of silicon and the Fabry-Perot filter 300 may be associated with a Micro-ElectroMechanical System (MEMS) device.

According to some embodiments, the actuator 330 is coupled to the movable mirror 310 via an attachment portion 340. Note that the actuator 330 could instead be attached directly to, or be part of, the movable mirror 310. In either case, the actuator 330 may move or "scan" the movable mirror 310 left and right in FIG. 3 to vary distance d over time.

As the movable mirror 310 is scanned, broadband light may enter the filter 300 (e.g., via fiber optic cable introducing the light through the fixed mirror 320) and some photons may reflect off of the fixed mirror 310 while others pass through the mirror 310 and enter the cavity C. While in the cavity C, the photons may reflect between the fixed and movable mirrors 310, 320, and eventually some of the photons may pass through the movable mirror 320 and exit the filter 300.

As a result, the filter 300 may act as a narrow-band optical filter and the wavelength of light that exits the filter may vary over time (as d is varied). That is, the wavelength of light output from the filter 300 will scan back and forth across a range of the optical spectrum over time. By measuring the intensity of the light at various times (and, therefore, various distances d and wavelengths), information about the light entering the filter can be determined.

Although a single pair of mirrors 310, 320 are illustrated in FIG. 3, additional mirrors may be provided (e.g., to define multiple cavities). Moreover, although flat, rectangular mirrors 310, 330 are illustrated in FIG. 3 other configurations may be provided. For example, one or both of the mirrors 310, 320 might be curved. Similarly, one or both of the mirrors 310, 320 might be U-shaped or I-shaped.

Figure 1:
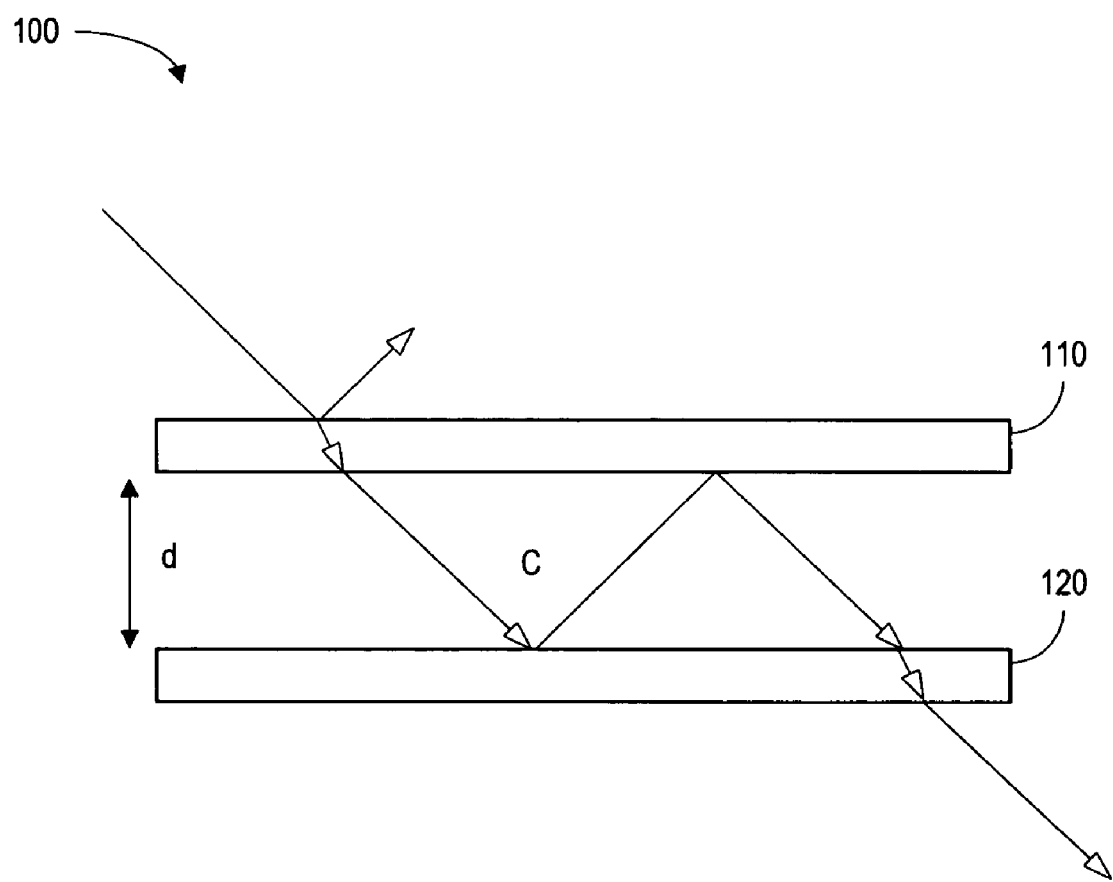
FIG. 1 is a side view of a Fabry-Perot filter.
Figure 2:
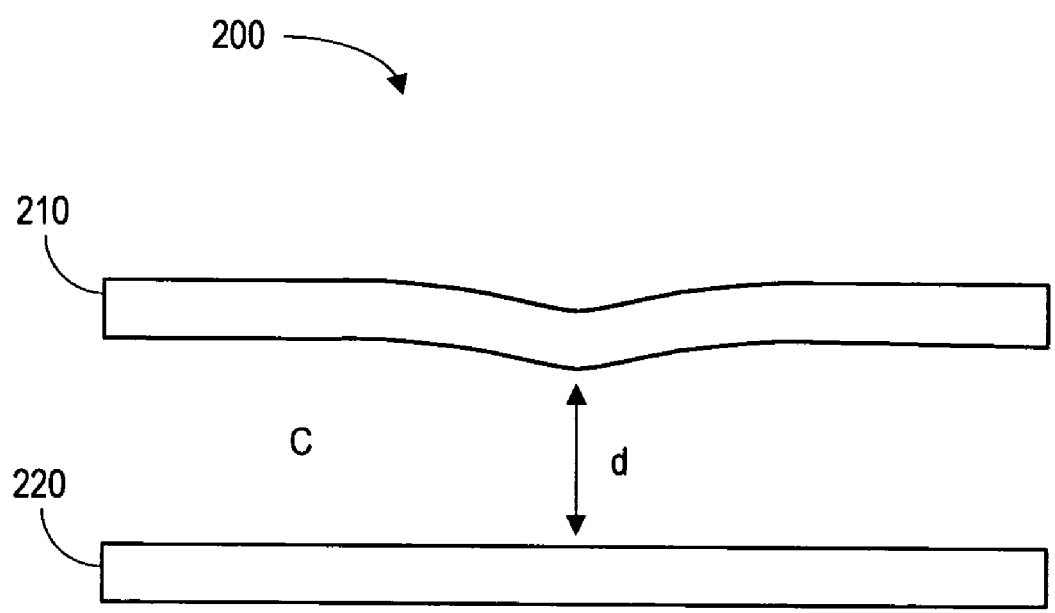
FIG. 2 is a side view of a Fabry-Perot filter implemented using a flexible diaphragm.

The actuator 330 may be any element capable of moving the movable mirror 310. Note that, unlike the flexible diaphragm approach described with respect to FIG. 2, the actuator 330 may be provided separate from the movable mirror 310. That is, the activation may be decoupled from the optics (e.g., the mirrors do not act as electrodes or movable membranes). As a result, the tunability of the filter 300 may be improved. In addition, the filter 300 may be scanned over longer distances and spatial (and therefore spectral) resolution may be increased. Also note that having the light enter the Fabry-Perot filter 300 via the fixed mirror 320 (as opposed to the movable mirror 310) may reduce stiction issues and prevent fluctuations in any gap between a fiber optic cable and the filter 300.

Figure 4:
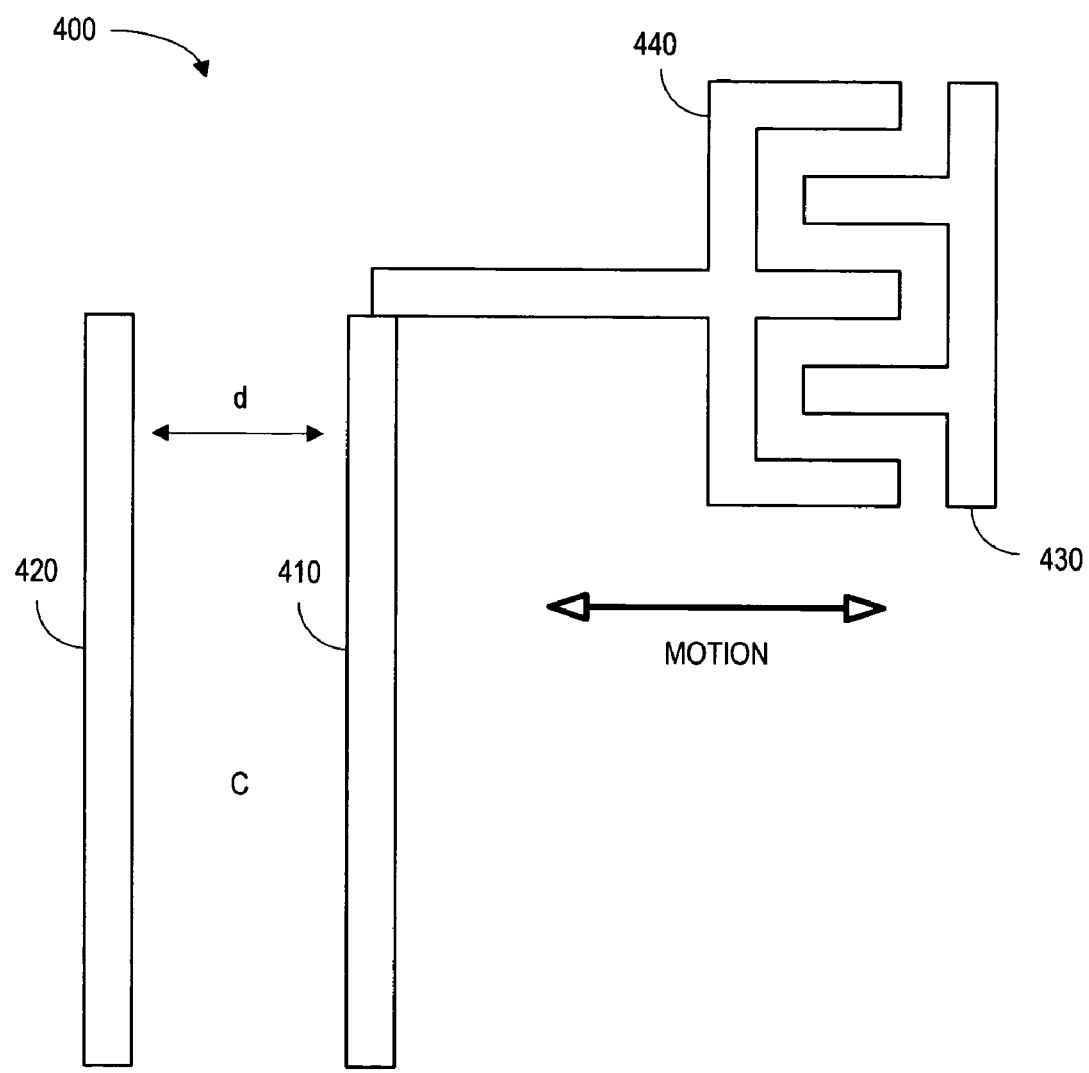
FIG. 4 is a top view of a Fabry-Perot filter having a comb drive in accordance with an exemplary embodiment of the invention.
Figure 9:
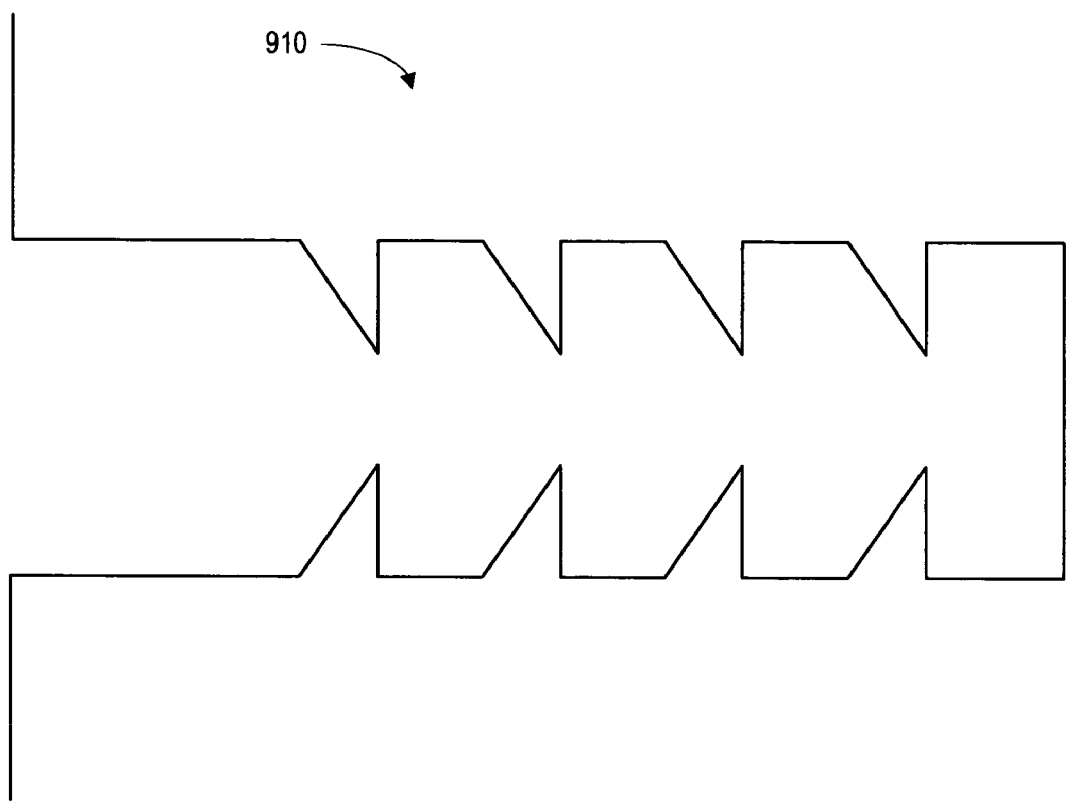
FIGS. 9-11 are illustrate irregularly shaped fingers in accordance with some exemplary embodiments of the invention.

FIG. 4 is a top view of a Fabry-Perot filter 400 having a comb drive in accordance with an exemplary embodiment of the invention. In this case, a movable mirror 410 may be moved with respect to a fixed mirror 420 by a first set of conducting portions or "fingers" 430 interlaced with a second set of conducting fingers 440. A varying voltage difference may be provided between the fingers 430, 440 causing the fingers 430, 440 to be pushed/pulled left or right in FIG. 4. Note that any number of fingers may be provided for a comb drive (and that any number of comb drives may be provided for a Fabry-Perot filter 400). Moreover, one or more of the fingers may be an irregularly shaped finger as described with respect to FIGS. 9 through 11.

Figure 5:
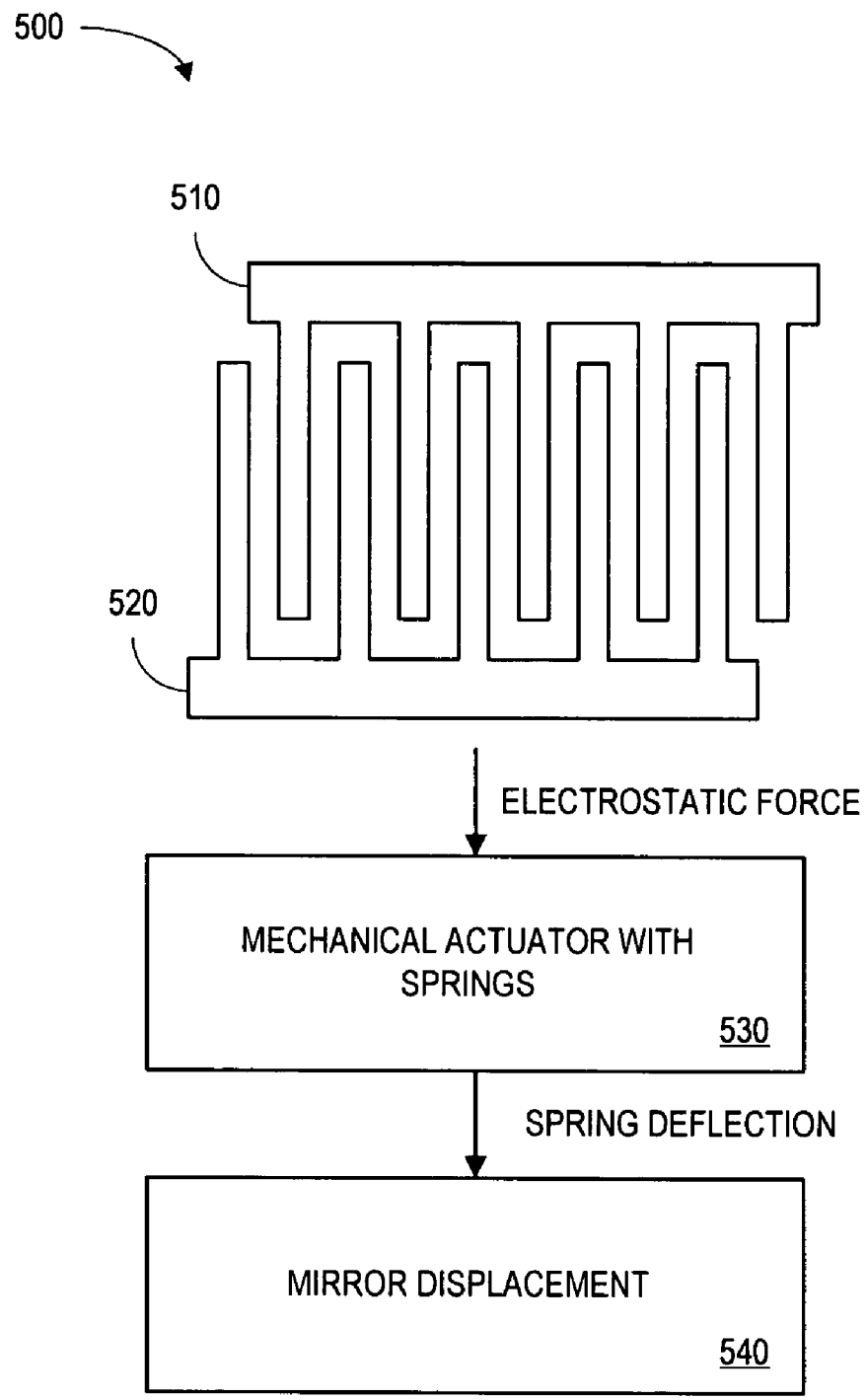
FIG. 5 illustrates how an applied voltage may be translated into mirror displacement in accordance with some exemplary embodiments of the invention.

FIG. 5 illustrates a system 500 wherein an applied or "driving" voltage applied to a drive is translated into mirror displacement in accordance with some exemplary embodiments of the invention. In particular, the driving voltage may cause rotor beams or fingers 510 to push away (or pull toward) anchored stator fingers 520. In the case of a comb drive, the rotor fingers 510 may be pushed to pulled upwards or downwards in FIG. 5. In the case of a parallel plate drive, the rotor fingers 510 may be pushed to pulled left or right in FIG. 5.

The electrostatic force may, via a mechanical actuator with springs 530, cause deflection in the springs and, as a result, a mirror may be displaced 540 from a first latched position (associated with a first voltage) to a second latched position (associated with a second voltage).

Figure 6:
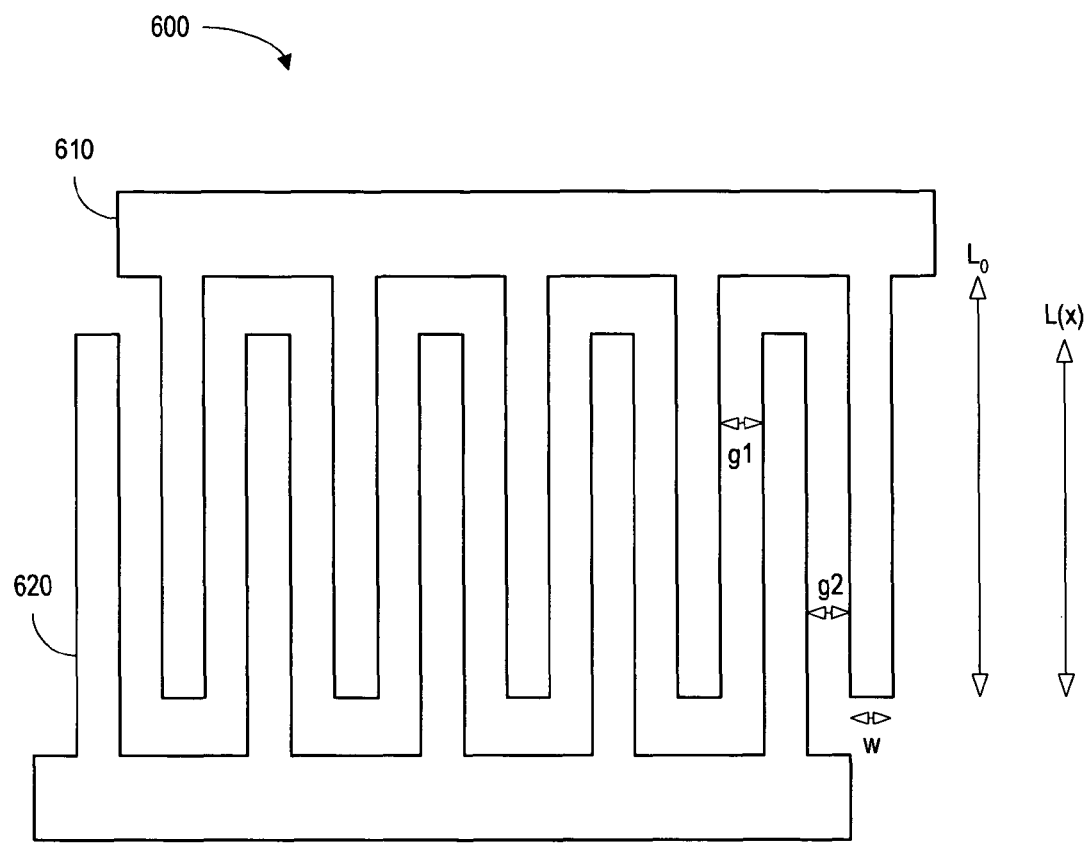
FIG. 6 illustrates a Fabry-Perot filter drive in accordance with some exemplary embodiments of the invention.

The amount of electrostatic force generated by the system 500 may depend on several factors. Consider, for example, the drive 600 illustrated in FIG. 6. The amount of electrostatic force generated by the drive 600 may depend on, for example, a modulus of elasticity and/or a relative permittivity associated with the drive 600; the shapes, lengths ($L_0$), heights, widths (w), and gaps (g1, g2) associated with rotor fingers 610 and anchored stator fingers 620 (as well as the number of fingers 610, 620 and the overlap (L(x) between them); and stiffnesses in the actuation, orthogonal, and out of plane directions.

Figure 7:
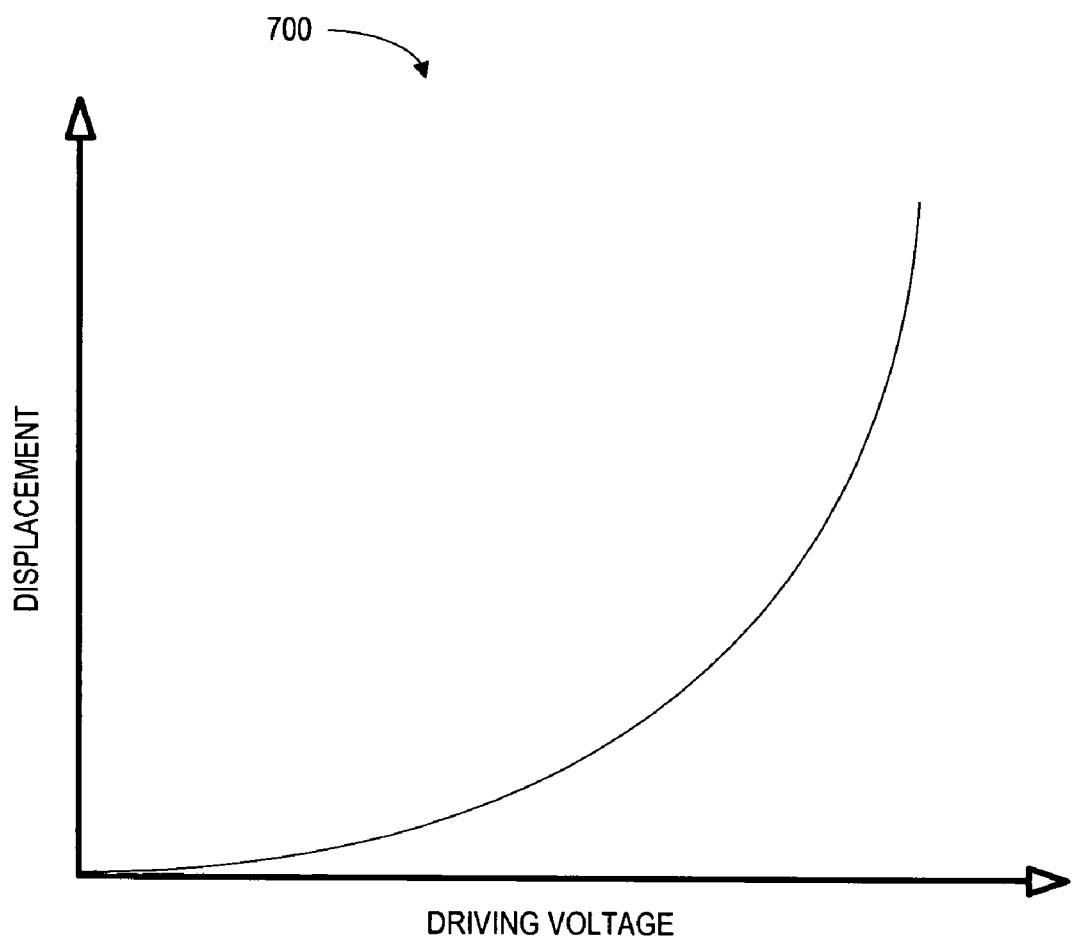
FIGS. 7 and 8 are graphs illustrating relationships between a driving voltage and an amount of mirror displacement.
Figure 8:
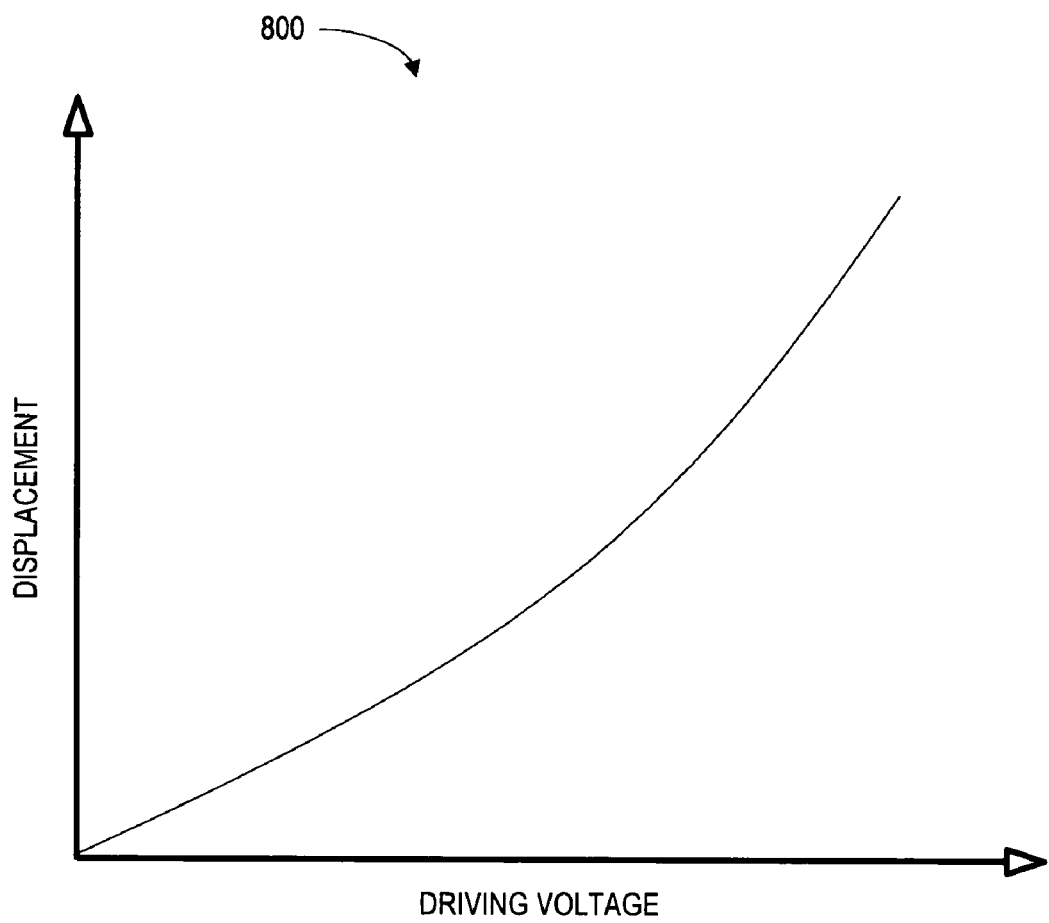

Typically, there is a quadratic relationship between a voltage applied to the drive 600 and an amount of mirror displacement that results from that voltage. For example, FIG. 7 is a graph 700 that illustrates a relationship between a driving voltage and an amount of mirror displacement, wherein the displacement is a function of the square of the voltage. By adjusting the physical parameters described with respect to FIG. 6, however, the relationship between a driving voltage and mirror displacement can be altered. For example, FIG. 8 is a graph 800 that illustrates a substantially linear relationship between a driving voltage and an amount of mirror displacement. That is, the displacement is substantially a function of the voltage (as opposed to a square of the voltage). Moreover, a drive 600 may be designed to be i"meta-stable." For example, the overlap L(x) between the fingers 610, 620 might be selected such that no force is generated at a particular voltage. Such an approach might reduce an amount of ringing associated with a latched position.

To improved performance of a comb drive actuator, some or all of the fingers of the comb drive may be "irregularly shaped." As used herein, the phrase "irregularly shaped" may refer to, for example, a non-boxed shaped beam. For example, at least one surface of an irregularly shaped finger may have be non-planar. Consider, for example, FIG. 9 which is a top view of a finger 910 that has an irregular shape. In particular, the surfaces of the finger 910 that face neighboring fingers (represented by the top and bottom lines in FIG. 9) have a "saw-tooth profile. By providing an irregularly shaped finger 910, electric fields and forces may result that are different, and in some case, more appropriate for a Fabry-Perot movable mirror as compared to a typical boxed shape beam finger.

Figure 10:
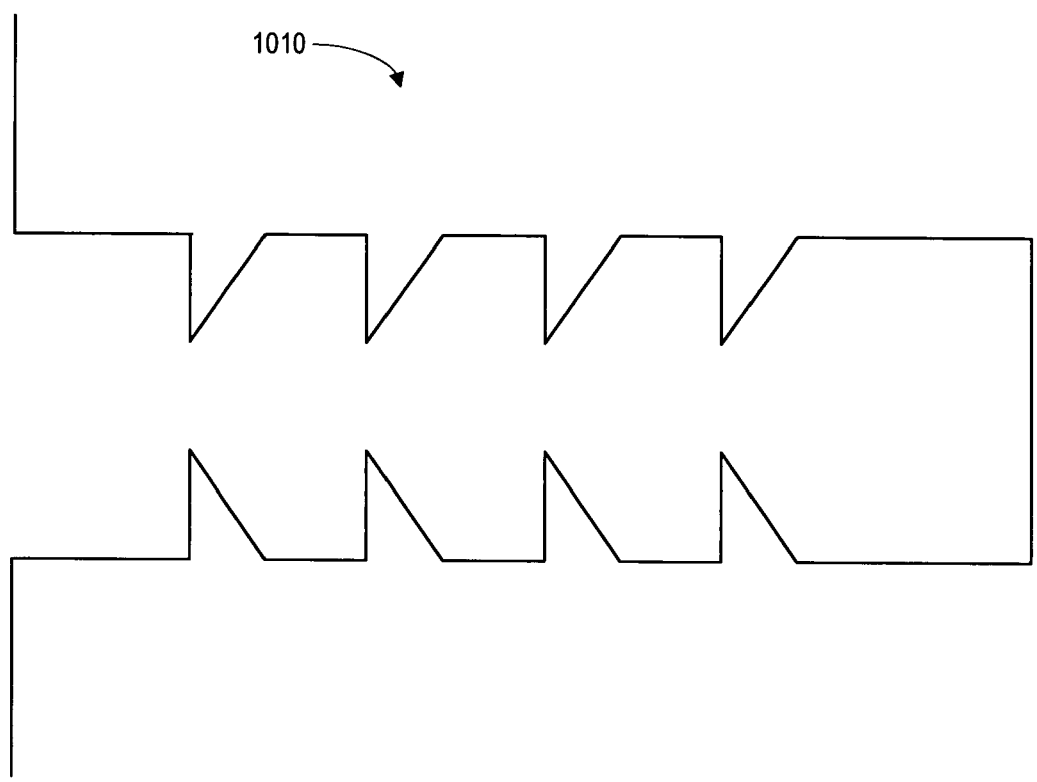

As another example, FIG. 10 illustrates an irregularly shaped finger 1010 wherein the surfaces of the finger 1010 that face neighboring fingers (represented by the top and bottom lines in FIG. 10) have a "reverse saw-tooth" profile. As other example, irregularly shaped fingers may be associated other triangular profiles, sinusoidal surfaces, and/or tapered corners and/or edges. Moreover, instead of notched portions along the finger walls, an irregularly shaped finger might instead be provided with one or more raised portions.

Figure 11:
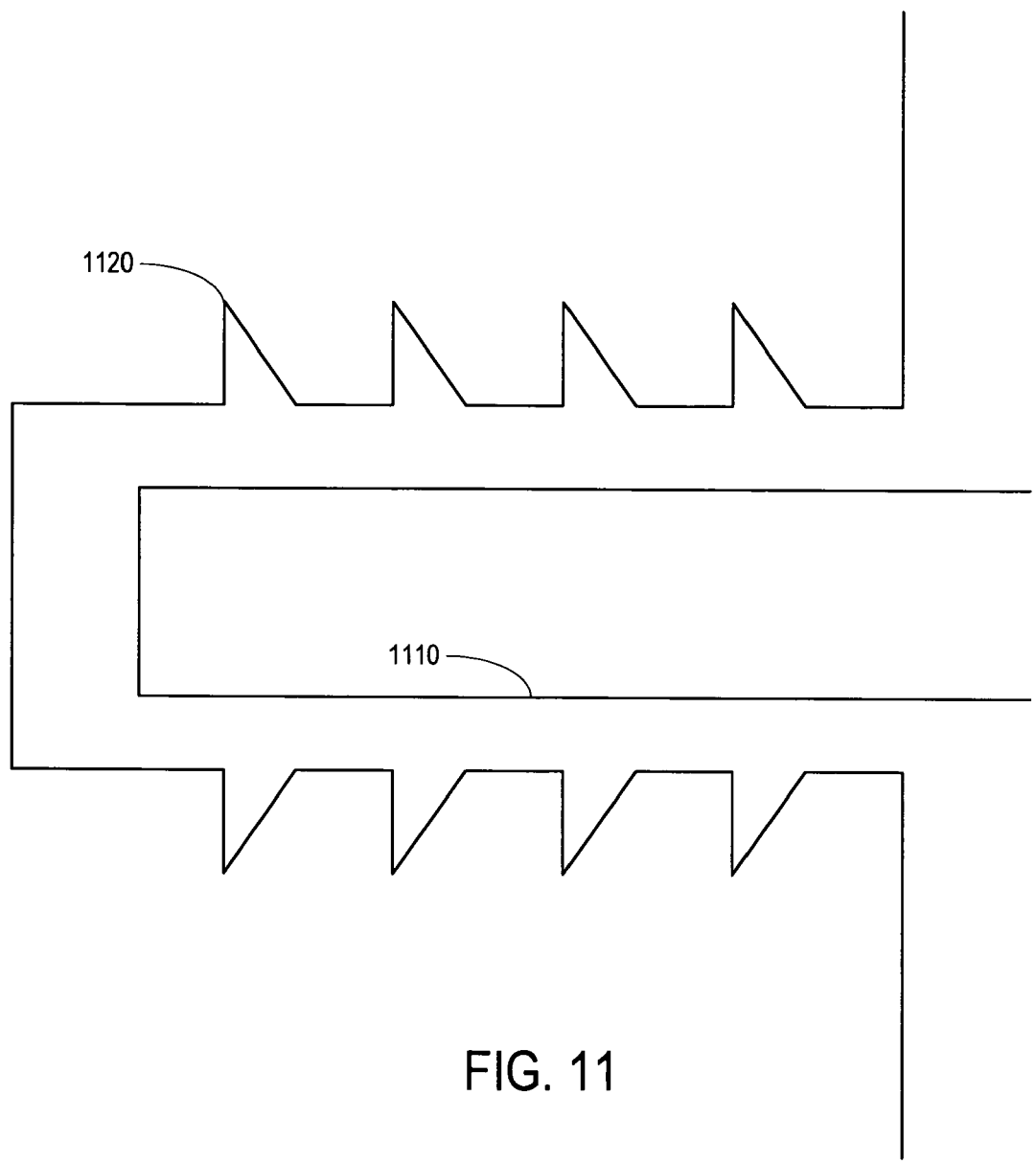

Note that some regularly shaped fingers may be included in embodiments described herein. For example, FIG. 11 illustrates a regularly shaped 1110 finger neighbored by two irregularly shaped fingers or walls 1120. Note that a comb drive may have both movable fingers and anchored fingers. Either the movable fingers, the anchored fingers, or both the movable and anchored fingers may be irregularly shaped according to any of the embodiments described herein.

Figure 12:
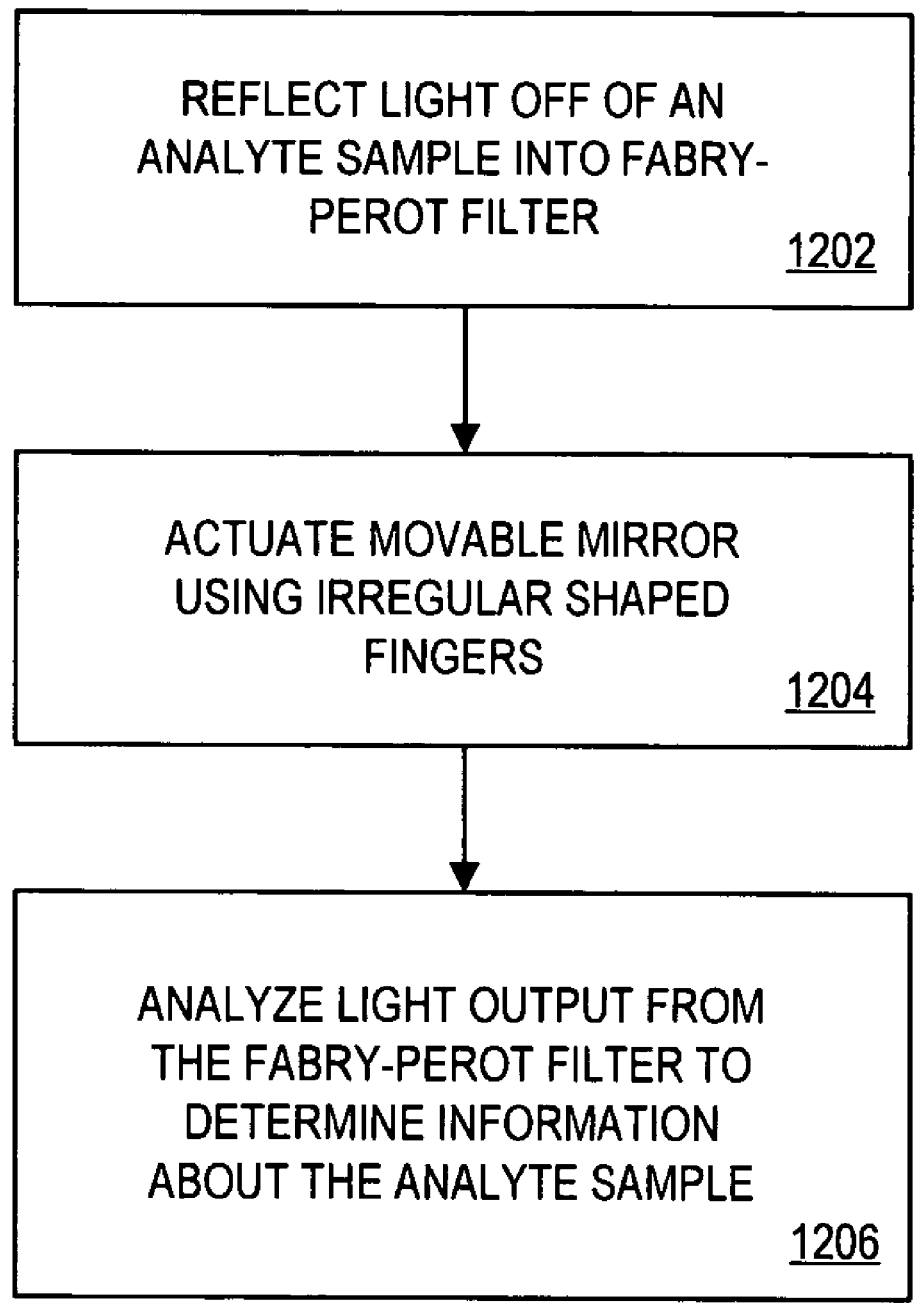
FIG. 12 illustrates a method to analyze a sample of molecules according to some embodiments.

A Fabry-Perot filter drive having irregularly shaped fingers might be associated with, for example, a spectrometer. For example, FIG. 12 illustrates a method to analyze a sample of molecules according to some embodiments. At Step 1202, light is reflected from an analyte sample into a Fabry-Perot filter formed in a silicon wafer. At Step 1204, a movable mirror associated with the Fabry-Perot filter is actuated using irregularly shaped fingers. At step 1206, light output from the Fabry-Perot filter is analyzed across an optical spectral range to determine information about the analyte sample.

Figure 13:
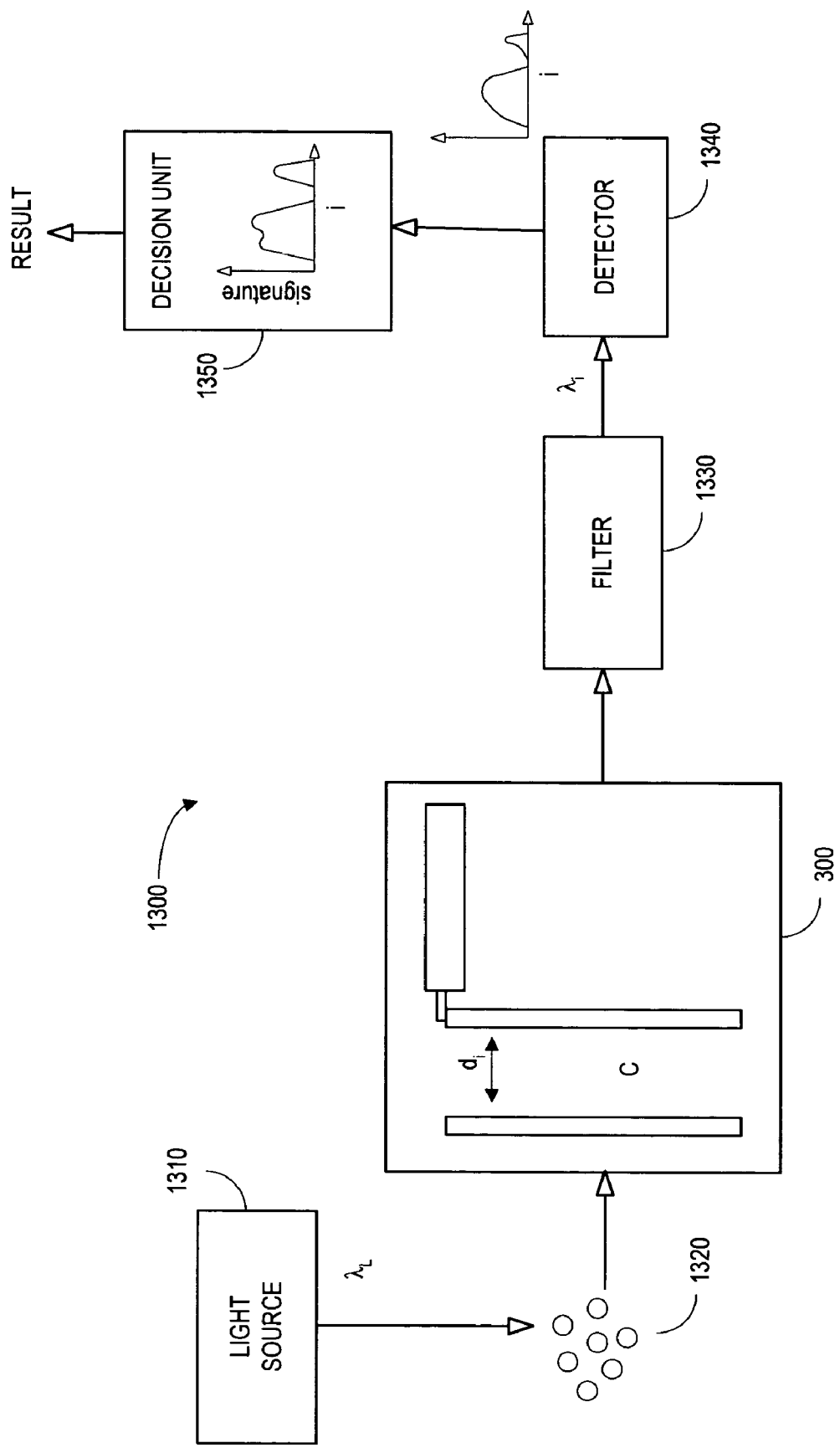
FIG. 13 illustrates a spectrometer according to some embodiments.

FIG. 13 illustrates a spectrometer 1300 that might be associated with, for example, a Raman device, an infra-red absorption device, and/or a fluorescence spectroscopy device. According to this embodiment, the spectrometer 1300 includes a light source 1310 (e.g., a laser associated with $\lambda_L$) that provides a beam of light to an analyte sample 1320. Photons are reflected off of the analyte sample 1320 and pass through the Fabry-Perot filter 300 as described, for example, with respect to FIG. 3 and may include irregularly shaped fingers as described with respect to FIGS. 9 through 11. According to some embodiments, another filter 1330 may also be provided (e.g., a Rayleigh filter to remove $\lambda_L$).

Because the Fabry-Perot filter 300 is scanning $d_i$ over time, a detector 1340 may measure light having varying wavelengths $\lambda_L$ over time. These values may be provided to a decision unit 1350 that compares the values with a signature of a known molecule (or sets of molecules) signatures. Based on the comparison, the decision unit 1350 may output a result (e.g., indicating whether or not any of the signatures were detected).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although a single movable mirror has been provided in some embodiments described herein, note that both mirrors associated with a Fabry-Perot cavity might be movable (and each mirror might be simultaneously moved with respect to the other mirror).

Further, although particular coatings, layouts and manufacturing techniques have been described herein, embodiments may be associated with other coatings, layouts and/or manufacturing techniques. For example, cap wafers with optical and/or electrical ports may be provided for any of the embodiments described herein. Such wafers may, for example, be used to interface with an Application Specific Integrated Circuit (ASIC) device.

Moreover, although Fabry-Perot filter designs have been described with respect to spectrometers, note that such filters may be used with any other types of devices, including telecommunication devices, meteorology devices, and/or pressure sensors.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A micro-electrical mechanical system apparatus, comprising:
   a comb drive actuator;
   wherein said comb drive actuator includes a set of movable fingers and a set of anchored fingers;
   said set of movable fingers or said set of anchored fingers having a first finger, wherein a surface of said first finger has at least one of: (i) a saw-tooth profile and (ii) a reverse saw-tooth profile; and
   at least one movable Fabry-Perot filter cavity mirror coupled to said comb drive actuator.

2. The apparatus of claim 1, wherein said set of movable fingers includes said first finger.

3. The apparatus of claim 2, wherein said surface of said first finger faces an anchored finger.

4. The apparatus of claim 1, wherein said set of anchored fingers includes said first finger.

5. The apparatus of claim 4, wherein said surface of said first finger faces a movable finger.

6. The apparatus of claim 1, wherein said comb drive actuator comprises a bi-stable device associated with a first latched position and a second latched position.

7. The apparatus of claim 6, wherein said bi-stable device is within a plane and said at least one movable mirror is oriented substantially normal to the plane.

8. The apparatus of claim 7, wherein the plane is defined by a silicon wafer and further comprising:
   a fixed mirror oriented substantially normal to the plane and substantially parallel to said at least one movable mirror.

9. The apparatus of claim 1, wherein said Fabry-Perot filter cavity is associated with a spectrometer.

10. The apparatus of claim 9, further comprising:
    a light source to provide broadband light scattered from an analyte sample; and
    a sensor to sense photons exiting said Fabry-Perot filter cavity over time as said at least one movable mirror is moved by said comb drive actuator.

11. The apparatus of claim 1, wherein a relationship between a voltage applied to said comb drive actuator and an amount of displacement associated with said at least one movable mirror is substantially linear.

12. The apparatus of claim 1, wherein said apparatus is associated with at least one of: (i) a telecommunication device, (ii) a meteorology device, and (iii) a pressure sensor.

13. A method, comprising:
routing light from a sample of molecules into a tunable Fabry-Perot cavity;
actuating a movable Fabry-Perot filter cavity mirror using a comb drive actuator;
wherein said comb drive actuator includes a set of movable fingers and a set of anchored fingers;
said set of movable fingers or said set of anchored fingers having a first finger, the first finger having a surface that has at least one of: (i) a saw-tooth profile and (ii) a reverse saw-tooth profile, wherein actuation distances are associated with a spectral range of light wavelengths; and
detecting interference patterns across the spectral range.

14. The method of claim 13, further comprising:
comparing the detected interference pattern with a signature pattern associated with a particular molecule.

15. The method of claim 14, further comprising:
providing an indication based on said comparing.

16. A spectrometer, comprising:
a laser source;
an analyte sample to reflect light from the laser source;
a Fabry-Perot filter cavity to receive the reflected light;
at least one movable Fabry-Perot filter cavity mirror associated with said Fabry-Perot filter cavity;
a comb drive actuator coupled to said at least one movable mirror, wherein said comb drive actuator includes a set of movable fingers and a set of anchored fingers;
said set of movable fingers or said set of anchored fingers having a first finger, wherein a surface of said first finger has at least one of: (i) a saw-tooth profile and (ii) a reverse saw-tooth profile;
a detector to detect photons exiting said Fabry-Perot filter cavity over time as said at least one movable mirror is moved by said comb drive actuator; and
a decision unit to determine if the analyte sample is associated with at least one type of molecule based on the sensed photons.

17. The spectrometer of claim 16, wherein said spectrometer comprises at least one of: (i) a Raman device, (ii) an infra-red absorption device, and (iii) a fluorescence spectroscopy device.

18. The spectrometer of claim 16, wherein said comb drive actuator is associated with a first latched position and a second latched position.

19. A micro-electrical mechanical system apparatus, comprising:
a comb drive actuator driven by a voltage, wherein said comb drive actuator includes a set of movable fingers and a set of anchored fingers;
said set of movable fingers or said set of anchored fingers having a first finger, wherein a first surface of said first finger has at least one of: (i) a saw-tooth profile and (ii) a reverse saw-tooth profile;
and at least one movable Fabry-Perot filter cavity mirror coupled to said comb drive actuator, wherein a relationship between the voltage and an amount of displacement associated with said at least one movable mirror is substantially linear.

20. The micro-electrical mechanical system apparatus of claim 19, wherein said set of movable fingers or said set of anchored fingers further comprises a second finger, wherein a first surface of said second finger has at least one of: (i) a saw-tooth profile and (ii) a reverse saw-tooth profile, and a third finger positioned between said first finger and said second finger.

* * * * *